Jan. 8, 1957  G. B. MARSDEN  2,776,842
TRANSVERSELY OSCILLATING JAW CHUCK
Filed April 5, 1954  2 Sheets-Sheet 1
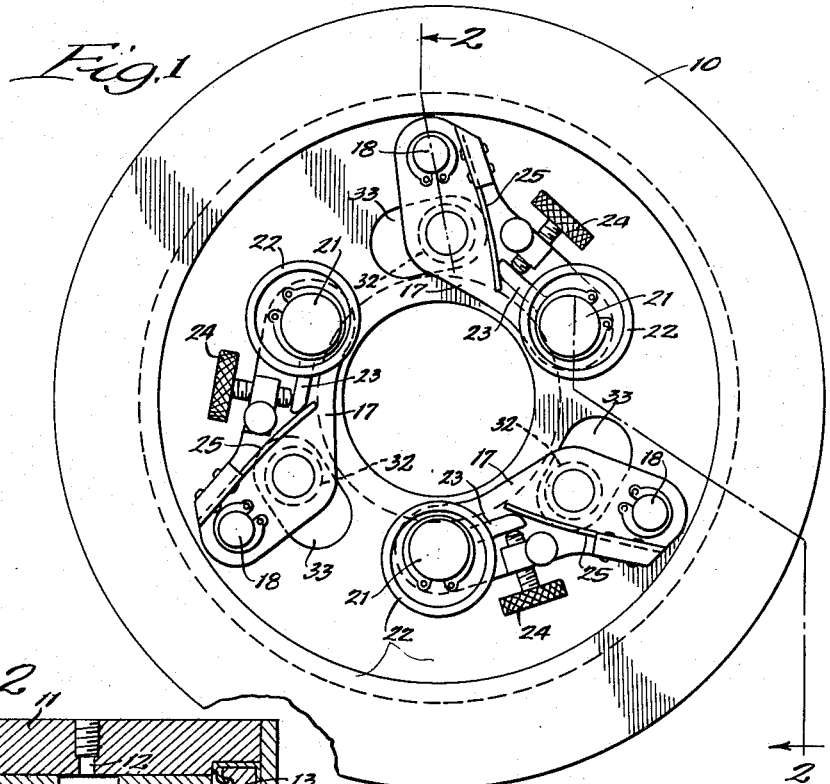
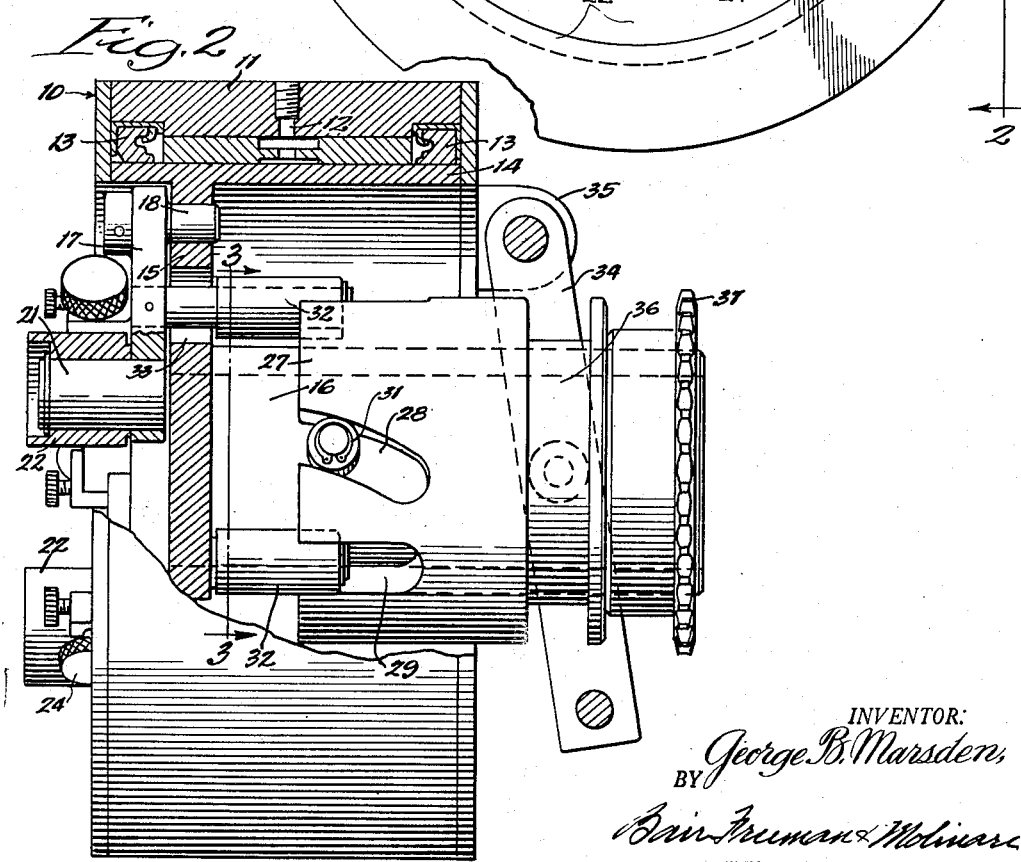
INVENTOR:
George B. Marsden,
BY
ATTORNEYS.

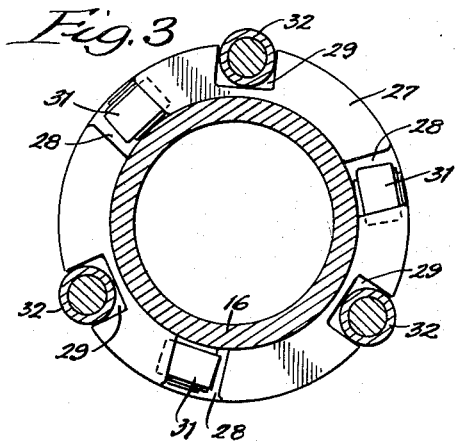
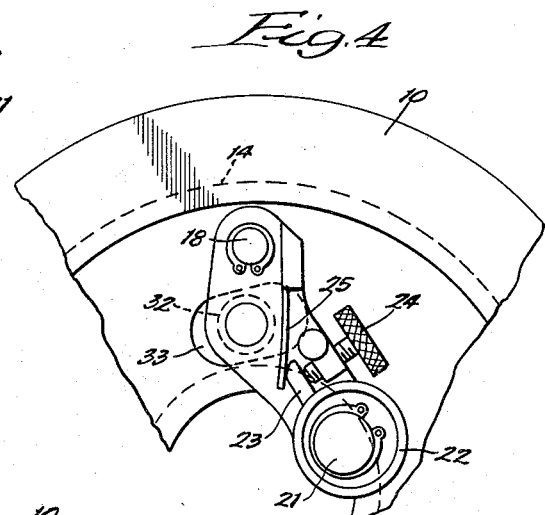
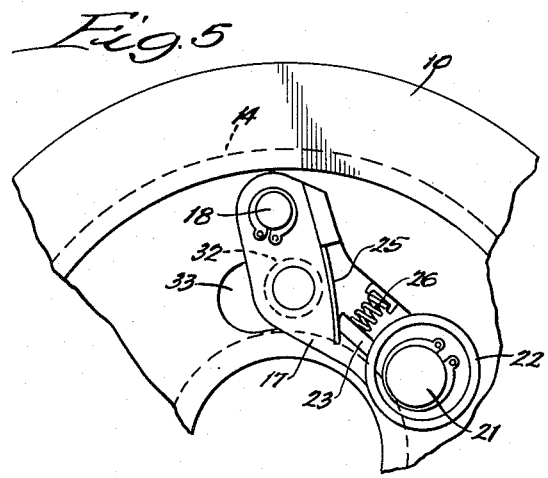

United States Patent Office 2,776,842
Patented Jan. 8, 1957

2,776,842

TRANSVERSELY OSCILLATING JAW CHUCK

George B. Marsden, Cicero, Ill., assignor to Chicago Nipple Manufacturing Company, Cicero, Ill., a corporation of Delaware Application April 5, 1954, Serial No. 420,922

7 Claims. (Cl. 279—33)

This invention relates to chucks and more particularly to chucks for gripping pipes, rods, and the like for cut-off, threading, or other machining operations.

In machines for cutting off, threading, or otherwise working lengths of pipe or rod, it is necessary to be able to chuck a workpiece rapidly and accurately regardless of minor variations in size. It is also highly desirable to be able to use the same chuck over a wide range of nominal sizes without requiring changes in jaws or other major adjustments of the chuck. For automatic operations, it is further essential that the chuck be operable easily without exertion of a large amount of force to hold the workpieces securely.

It is one of the objects of the present invention to provide a chuck in which workpieces are gripped and released rapidly and easily and are held securely during machining operations thereon.

Another object is to provide a chuck in which the gripping force is increased in response to the load on the workpiece.

According to one feature of the invention, the workpieces are gripped by eccentric gripping rollers rotatable in response to the turning force on the workpiece to increase their gripping effect. The rollers are normally urged by spring means to a position in which their low points will engage the workpieces so that any rotation thereof in response to turning force on the workpiece will increase the gripping effect and so that the workpieces will be accurately centered. This construction also enables workpieces of different sizes to be gripped securely.

A further object is to provide a chuck in which the gripping elements are carried by pivoted levers mounted for movement to and from a gripping position so that gripping and releasing may be effected rapidly and easily and a wide range of sizes of workpieces can be handled.

A still further object is to provide a chuck in which the levers carrying the gripping elements are moved simultaneously and equally by an axially shiftable control collar which is shiftable on the chuck body.

According to one feature of the invention, the control collar acts through cam slots to swing the levers which carry the gripper elements so that a relatively small force on the chuck collar will hold the levers in gripping position.

The above and other objects and features of the invention will be more readily apparent from the following description when read in connection with the accompanying drawing, in which:

Figure 1 is an end view of a chuck embodying the invention;

Figure 2 is a partial section on the broken line 2—2 of Figure 1;

Figure 3 is a section on the line 3—3 of Figure 2;

Figure 4 is a partial enlarged elevation showing the mounting and control of a gripping roller; and Figure 5 is a view similar to Figure 4 of an alternative construction.

The chuck, as shown, is adapted to rotate thereby to turn a workpiece held in the chuck for cooperation with a stationary cut-off knife, or similar tool. As shown, a housing 10 is provided which is adapted to be fixedly mounted in a machine and which comprises an annular bearing ring 11 in which the chuck itself is rotatable. The bearing ring may be lubricated through passages 12 and may be provided with seals 13 to prevent leakage of lubricant.

The chuck comprises a body having an annular flange 14 fitting rotatably in the bearing ring 11 and connected through a web 15 to an elongated tubular hub 16. The workpieces to be machined are adapted to be passed through the hub and to be gripped adjacent one end thereof for the desired machining operation. In the case of a cut-off, an elongated rod or pipe may be passed through the hub to be cut into shorter lengths by a cut-off tool mounted adjacent to the chuck, as more particularly described and claimed in my copending application Serial No. 420,923, filed April 5, 1954.

The workpieces are adapted to be gripped by gripping elements carried by levers 17 pivotally mounted on the web 15 symmetrically about the axis of the hub. As shown, three such levers are provided to center the workpiece accurately, although if desired a number more than three could be provided for additional gripping. Each of the levers 17 is pivoted on a pin 18 adjacent to the periphery of the web 15 and extends inward and circumferentially to terminate in a free end lying adjacent to the periphery of the tubular hub. With this construction, as the levers are swung about their axes, their free ends will move radially toward and away from the axis of the hub to grip and release positions.

Each lever carries at its free end a gripping element to engage and grip the workpiece. As shown, the free end of each lever carries a pin 21 extending parallel to the axis of the hub and of the pivots 18 and an eccentric gripping roller 22 is rotatably mounted on each of the pins 21. The rollers 22 may have their outer surfaces roughened or knurled, if desired, to increase their gripping effect on the workpieces and are adapted to turn on the pins 21 in response to torque on the workpiece to increase their gripping effect. Normally each roller 22 is held in the position shown with its low point facing the axis of the hub so that the low point of the roller will first engage the workpiece. In this way, any turning of the rollers will produce a wedging effect to increase their gripping action and since all of the rollers are in the same initial position, the workpiece will be accurately centered. To hold the gripping rollers in the desired position, as shown in Figures 1 to 4, each roller is formed with a projecting arm 23 extending along the lever and engageable with an adjustable stop nut 24 carried by the lever to limit rotation of the roller in one direction to a position in which the low spot thereon faces the hub axis. A leaf spring 25 carried by the lever engages the free end of the arm 23 and urges it toward the adjustable stop 24. However, upon any tendency of the rollers to turn in a counter-clockwise direction, the springs 25 will yield allowing relatively free turning of the rollers to wedge against the workpieces. The stops 24 may also be adjusted to insure accurate concentricity of the grippers without requiring extreme accuracy in manufacture of the parts. This construction is preferably employed when rotation in one direction only is encountered, as when the chuck is turned counter-clockwise.

When the chuck may turn in either direction, the construction shown in Figure 5 is preferably employed, parts in Figure 5 corresponding to identical parts in Figures 1 to 4 being indicated by the same reference numerals. In this construction, the adjustable stop 24 is replaced by a coil spring 26 and the strength of the springs 25 and 26 is so balanced that the roller will normally be held in the desired initial position. Upon any tendency to rotate the roller in either direction, one of the springs 25 or 26 will yield to permit turning of the roller to produce the wedging effect.

Movement of the levers 17 to move the gripping rollers between their chucking and releasing positions is controlled by a control collar 27 mounted on the hub 16 for axial shifting and for free rotary movement. The collar 27 is formed with two sets of slots 28 and 29 which lie at an acute angle to each other. As shown, slots 28 lie at an angle to the axis of the collar while the slots 29 are straight axial slots, although this relationship could be reversed, if desired.

The slots 28 engage guide rollers 31 which are rotatable on pins projecting radially from the hub 16, as best seen in Figure 3. As shown, three slots and three rollers are provided to cooperate with the three levers 17 although more or less rollers and slots could be provided if desired. The slots 29 receive roller or bearing units 32 which are rotatably mounted on pins extending axially from the mid-portion of the levers 17. These pins extend through elongated slots 33 in the web 15 so that they can move circumferentially relative to the web to swing the levers.

The control collar 27 is adapted to be shifted axially by a yoke 34 pivoted on a lug 35 carried by the housing 10 and carrying rollers which engage in an annular groove 36 in the shift collar. The yoke 34 may be swung about its pivot on the lug 35 in any desired manner, either manually or through a control motor. When the collar and yoke are shifted to the right, as shown in Figures 1 and 2, the collar will be turned clockwise, as seen in Figure 1, to swing the free ends of the levers 17 radially outward from the opening in the hub. In this position a workpiece extending through the hub will be released. When the collar is shifted to the left toward the web 15, it will turn counter-clockwise, as seen in Figure 1, and will swing the levers 17 in a direction to move their free ends radially inward. As the levers move simultaneously, the low spots of the gripping rollers will simultaneously engage the workpiece to center it in the chuck. If the chuck is turning resistance of the workpiece will tend to turn the rollers 22 on the pins 21 to wedge the workpiece tightly and to hold it securely. It will be observed that all of the rollers will turn to substantially the same extent so that the workpiece will be held accurately centered and will be securely gripped. Radial outward force on the gripping rollers will tend to swing the levers out and to shift the collar 27 back to the right, but because of the collar angle employed, which may be such that its tangent is approximately equal to coefficient of friction, the collar can be held in gripping position with a relatively small operating force applied to the yoke 34. Thus a relatively small motor may be employed to shift the yoke 34 and the small force provided thereby, together with the wedging action of the gripping rollers will be sufficient to hold the workpiece very securely.

The chuck may be turned to turn the workpiece by providing at the rear end of the hub 16 a driving sprocket 37 to mesh with a driving chain. It will be seen that this driving mechanism will not interfere with insertion of elongated rods or pipes through the chuck and that such workpieces can be inserted through the rear end of the hub and feed progressively through the front end thereof as they are operated upon. Upon completion of an operation, the yoke 34 and control collar 27 may be shifted back to the right with a relatively small force to allow the levers 17 to swing outward. When the levers have swung out a relatively short distance, the workpiece will be released and the chuck will be in condition for further feed of the workpiece therethrough or for insertion of a new workpiece.

The chuck of the present invention is adapted to handle workpieces of varying external sizes from a relatively small diameter up to the internal diameter of the hub 16. Because all of the levers are swung simultaneously, the work piece will be centered regardless of its size and because the major part of the gripping force is provided by the wedging action of the rollers 22, a small rapidly acting motor or other operating means can be employed to shift the chuck between its gripping and releasing positions. The chuck therefore lends itself admirably to rapid automatic operations although it presents a number of advantages for individual manually controlled operations.

While one embodiment of the invention has been shown and described, it will be understood that this is illustrative only and is not to be taken as a definition of the scope of the invention, reference being had for this purpose to the appended claims.

What is claimed is:

1. A chuck comprising a chuck body having a central opening therein to receive a workpiece, at least three levers pivoted on the body symmetrically about the central opening on axes parallel to the central opening, means to swing the levers simultaneously about their pivots to move the free ends of the levers radially toward and away from the central opening, annular gripping rollers eccentrically pivoted on the free ends of the levers on axes parallel to the pivotal axes of the levers and resilient means acting between the levers and rollers respectively yieldingly to hold the rollers with their low points facing the central opening.

2. A chuck comprising a chuck body having a central opening therein to receive a workpiece, at least three levers pivoted on the body symmetrically about the central opening on axes parallel to the central opening, means to swing the levers simultaneously about their pivots to move the free ends of the levers radially toward and away from the central opening, gripping rollers eccentrically pivoted on the free ends of the levers on axes parallel to the pivotal axes of the levers, an adjustable stop for each roller to limit its rotation in one direction to a position in which its low spot faces the central opening, and a spring resiliently urging the roller in said one direction to said position.

3. A chuck comprising a chuck body including an elongated tubular hub through which a workpiece is adapted to pass, an annular control collar shiftable axially on the hub and formed with two sets of guide slots extending axially at an angle to each other, guide members secured to the chuck body radially beyond the hub and fitting slidably into one set of guide slots, operating members fitting slidably into the other set of slots to be moved circumferentially relative to the body as the collar is shifted axially, and gripper elements movably carried by the body radially beyond the hub and connected to the operating members to be operated thereby when the collar is shifted axially.

4. A chuck comprising a chuck body including an elongated tubular hub through which a workpiece is adapted to pass, an annular control collar shiftable axially on the hub and formed with two sets of guide slots extending axially at an angle to each other, guide members secured to the chuck body radially beyond the hub and fitting slidably into one set of guide slots, operating members fitting slidably into the other set of slots to be moved circumferentially relative to the body as the collar is shifted axially, levers pivoted on the body radially beyond the hub for movement of their free ends radially of the hub, the operating members being carried by the levers so that axial shifting of the collar will simultaneously swing the levers, and grippers carried by the free ends of the levers to grip a workpiece extending through the hub.

5. A chuck comprising a chuck body including an elongated tubular hub through which a workpiece is adapted to pass, an annular control collar shiftable axially on the hub and formed with two sets of guide slots extending axially at an angle to each other, guide members secured to the chuck body radially beyond the hub and fitting slidably into one set of guide slots, operating members fitting slidably into the other set of slots to be moved circumferentially relative to the body as the collar is shifted axially, levers pivoted on the body radially beyond the hub for movement of their free ends radially of the hub, the operating members being carried by the levers so that axial shifting of the collar will simultaneously swing the levers, and gripping rollers eccentrically pivoted on the free ends of the levers to grip a workpiece extending through the hub.

6. A chuck comprising a chuck body including an elongated tubular hub through which a workpiece is adapted to pass, an annular control collar shiftable axially on the hub and formed with two sets of guide slots extending axially at an angle to each other, guide members secured to the chuck body radially beyond the hub and fitting slidably into one set of guide slots, operating members fitting slidably into the other set of slots to be moved circumferentially relative to the body as the collar is shifted axially, levers pivoted on the body radially beyond the hub for movement of their free ends radially of the hub, the operating members being carried by the levers so that axial shifting of the collar will simultaneously swing the levers, eccentric gripping rollers rotatable on the free ends of the levers on axes parallel to the hub to grip a workpiece extending through the hub, and spring means resiliently to hold the rollers in positions in which their low points face the axis of the hub.

7. A chuck comprising a chuck body including an elongated tubular hub through which a workpiece is adapted to pass, a control collar shiftable axially on the hub and formed with two sets of guide slots extending axially at an angle to each other, guide members secured to the chuck body and fitting slidably into one set of guide slots, operating members fitting slidably into the other set of slots to be moved circumferentially relative to the body as the collar is shifted axially, gripper elements movably mounted on the body and connected to the operating members to be moved thereby into gripping and releasing positions as the collar is shifted axially on the hub, bearing means supporting the body for rotation about the hub axis, driving means connected to the hub to rotate the body, and operating means relative to which the collar is rotatable connected to the collar to shift it axially on the hub.

References Cited in the file of this patent

UNITED STATES PATENTS

| | | |
|---|---|---|
| 210,415 | Gage | Dec. 3, 1878 |
| 1,095,304 | Weiss | May 5, 1914 |
| 1,187,920 | Muller | June 20, 1916 |
| 1,812,221 | Spencer | June 30, 1931 |